United States Patent

Lee

(10) Patent No.: US 10,527,448 B2
(45) Date of Patent: *Jan. 7, 2020

(54) NAVIGATION SYSTEM WITH TRAFFIC ESTIMATION USING PIPELINE SCHEME MECHANISM AND METHOD OF OPERATION THEREOF

(75) Inventor: Shane-Woei Lee, Fremont, CA (US)

(73) Assignee: Telenav, Inc., Santa Clara, CA (US)

( * ) Notice: Subject to any disclaimer, the term of this patent is extended or adjusted under 35 U.S.C. 154(b) by 837 days.

This patent is subject to a terminal disclaimer.

(21) Appl. No.: 12/730,936

(22) Filed: Mar. 24, 2010

(65) Prior Publication Data

US 2011/0238285 A1  Sep. 29, 2011

(51) Int. Cl.
*G01C 21/36* (2006.01)

(52) U.S. Cl.
CPC .............................. *G01C 21/3691* (2013.01)

(58) Field of Classification Search
CPC .................................................. G01C 21/3691
See application file for complete search history.

(56) References Cited

U.S. PATENT DOCUMENTS

| | | | |
|---|---|---|---|
| 6,177,886 B1 | 1/2001 | Billington et al. | |
| 6,532,414 B2 | 3/2003 | Mintz | |
| 6,574,548 B2 | 6/2003 | DeKock et al. | |
| 6,650,948 B1 | 11/2003 | Atkinson et al. | |
| 6,911,918 B2 * | 6/2005 | Chen .......................... | 340/995.13 |
| 7,375,649 B2 * | 5/2008 | Gueziec ................. | H04W 4/029 340/905 |
| 7,576,661 B2 | 8/2009 | Mochizuki | |
| 7,617,041 B2 | 11/2009 | Sera | |
| 7,671,764 B2 | 3/2010 | Uyeki et al. | |
| 8,112,219 B2 * | 2/2012 | Johnson et al. .............. | 701/117 |
| 8,359,151 B2 * | 1/2013 | Carruthers et al. ........... | 701/119 |
| 8,909,463 B2 * | 12/2014 | Chapman ............ | G01C 21/3691 701/118 |
| 2002/0000920 A1 * | 1/2002 | Kavner .......................... | 340/905 |
| 2002/0087262 A1 | 7/2002 | Bullock et al. | |
| 2004/0119609 A1 | 6/2004 | Solomon | |
| 2005/0015197 A1 * | 1/2005 | Ohtsuji ................... | G01C 21/34 701/533 |
| 2007/0001873 A1 * | 1/2007 | Ishikawa ................ | G01C 21/32 340/994 |
| 2007/0112503 A1 | 5/2007 | Johnson et al. | |
| 2007/0185645 A1 * | 8/2007 | Chao .................... | G08G 1/0104 701/533 |

(Continued)

OTHER PUBLICATIONS

Wojnarski, Marcin, et al. "Ieee icdm 2010 contest: Tomtom traffic prediction for intelligent gps navigation." 2010 IEEE International Conference on Data Mining Workshops. IEEE, 2010.*

(Continued)

*Primary Examiner* — Asfand M Sheikh

(74) *Attorney, Agent, or Firm* — Perspectives Law Group, Corp.

(57) ABSTRACT

A method of operation of a navigation system includes: selecting a road segment from a road network; generating a start window and an end window for the road segment; calculating a start window traffic speed for the start window; calculating an end window traffic speed for the end window; and estimating a traffic flow of the road segment based on the start window traffic speed and the end window traffic speed for displaying on a device.

20 Claims, 8 Drawing Sheets

(56) References Cited

U.S. PATENT DOCUMENTS

| | | | |
|---|---|---|---|
| 2007/0208494 A1* | 9/2007 | Chapman | G08G 1/0104 |
| | | | 701/117 |
| 2008/0071465 A1* | 3/2008 | Chapman | G01C 21/3691 |
| | | | 701/117 |
| 2008/0312811 A1 | 12/2008 | Yamane | |
| 2009/0143971 A1 | 6/2009 | Carruthers et al. | |
| 2010/0198487 A1* | 8/2010 | Vollmer | G07B 15/02 |
| | | | 701/117 |
| 2011/0106416 A1* | 5/2011 | Scofield | G08G 1/0104 |
| | | | 701/119 |
| 2012/0166071 A1* | 6/2012 | Shirahatti | G01C 21/3492 |
| | | | 701/118 |

OTHER PUBLICATIONS

Hellinga, Bruce, et al. "Decomposing travel times measured by probe-based traffic monitoring systems to individual road segments." Transportation Research Part C: Emerging Technologies 16.6 (2008): 768-782.*

International Search Report for Application No. PCT/US2011/027330 dated Apr. 27, 2011.

* cited by examiner

US 10,527,448 B2

NAVIGATION SYSTEM WITH TRAFFIC ESTIMATION USING PIPELINE SCHEME MECHANISM AND METHOD OF OPERATION THEREOF

TECHNICAL FIELD

The present invention relates generally to a navigation system, and more particularly to a system for navigation system with traffic estimation using pipeline scheme mechanism.

BACKGROUND ART

Modern portable consumer and industrial electronics, especially client devices such as navigation systems, cellular phones, portable digital assistants, and combination devices are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a display of traffic congestion for the user with greater accuracy and lesser computation burden on the navigation system has become a paramount concern for the consumer. A navigation system that requires substantial computation burden can delay the display of the traffic congestion, and can lead to unsafe operation of the vehicle and can decrease the benefit of using the tool.

Thus, a need still remains for a navigation system with traffic estimation using pipeline scheme mechanism to provide accurate traffic congestion information without substantial delay to the user. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: selecting a road segment from a road network; generating a start window and an end window for the road segment; calculating a start window traffic speed for the start window; calculating an end window traffic speed for the end window; and estimating a traffic flow of the road segment based on the start window traffic speed and the end window traffic speed for displaying on a device.

The present invention provides a navigation system, including: a road segment selector module for selecting a road segment from a road network; a window generator module, coupled to the road segment selector module, for generating a start window and an end window for the road segment; a start window calculator module, coupled to the window generator module, for calculating a start window traffic speed for the start window; an end window calculator module, coupled to the window generator module, for calculating an end window traffic speed for the end window; and a traffic flow estimator module, coupled to the start window calculator module, for estimating a traffic flow of the road segment based on the start window traffic speed and the end window traffic speed for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
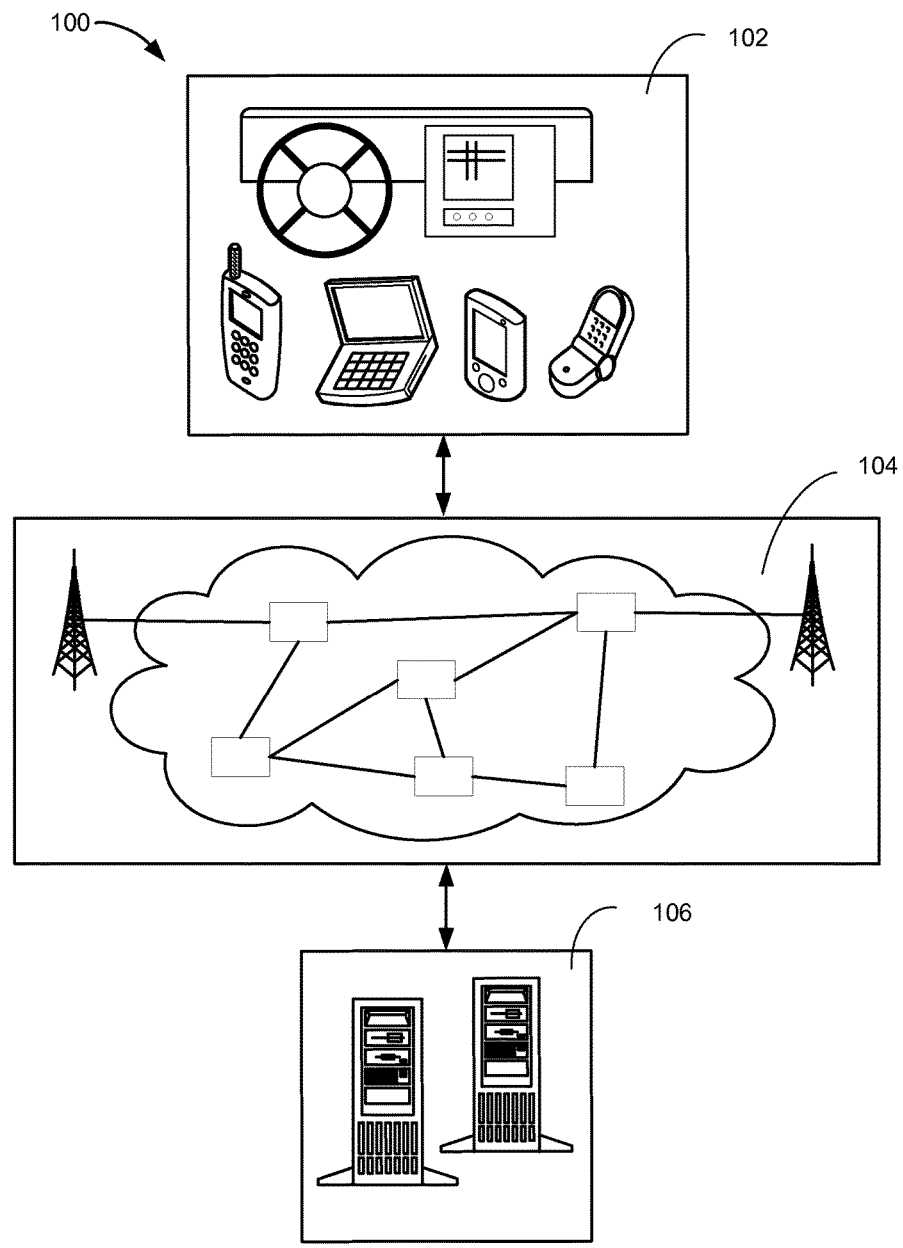
FIG. 1 is a navigation system with traffic estimation using pipeline scheme mechanism in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with traffic estimation using pipeline scheme mechanism in a first embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
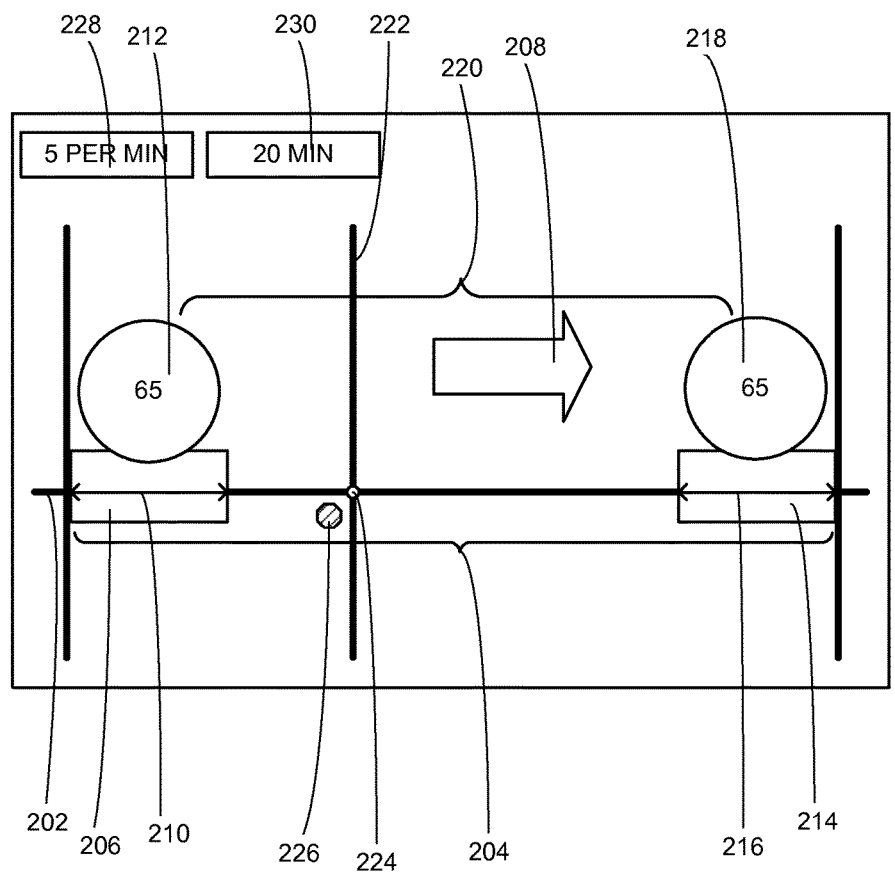
FIG. 2 shows a first example of a geographic view of the application of the navigation system.

Referring now to FIG. 2, therein is shown a first example of a geographic view of the application of the navigation system 100. The geographic view can include a road network 202 of a particular geographic region. For example, the road network 202 can represent a highway, a local street, or the combination thereof.

The road network 202 can include road segments 204. The road segments 204 can be portions of the highway, the local street, or a combination thereof.

Each of the road segments 204 can have a start window 206. The start window 206 represents the initial range of the road segments 204 where the speed of traffic along the road segments 204 can be first calculated. For example, the start window 206 can be placed where a traffic flow 208 of the road segments 204 commences or enters. For example, the start window 206 can represent the first 2 kilometers of the road segments 204.

The start window 206 can include a start window range 210. The start window range 210 represents the length of the start window 206. For example, the road segments 204 can be 10 kilometers long. The start window range 210 can be 2 kilometers.

A start window traffic speed 212 represents the speed of the traffic traveling through the start window 206. For example, the start window traffic speed 212 can represent the average speed of the start window traffic speed 212. The start window traffic speed 212 can represent the average speed of one hundred for the start window traffic speed 212. As a more specific example, the start window traffic speed 212 can be 65 kilometers per hour.

Each of the road segments 204 can have an end window 214. The end window 214 represents the portion of the of the road segments 204, at a portion where the start window 206 is located, where the speed of the traffic along the road segments 204 can be calculated exiting the road segments 204.

The end window 214 can include an end window range 216. The end window range 216 represents the length of the end window 214. Continuing with the previous example, the end window 214 can represent the last 2 kilometers of the road segments 204. For example, the end window range 216 can be 2 kilometers.

An end window traffic speed 218 represents the speed of the traffic traveling through the end window 214. For example, the end window traffic speed 218 can represent the average speed of the end window traffic speed 218. The end window traffic speed 218 can represent the average speed of one hundred for the end window traffic speed 218. As a more specific example, the end window traffic speed 218 can be 65 kilometers per hour.

A time frame 220 represents the timing of the calculation by the navigation system 100 for the start window traffic speed 212 and the end window traffic speed 218. For example, the time frame 220 can represent immediate time or a period of current time. The end window traffic speed 218 can be calculated immediately after the calculation of the start window traffic speed 212.

The traffic flow 208 represents the traffic condition of the road segments 204. For example, the traffic flow 208 can be no traffic, a light traffic jam, a moderate traffic jam, a heavy traffic jam, or a combination thereof. The traffic flow 208 for this figure represents a flow of traffic heading from the left to the right of the figure.

A crossroad 222 represents a path that intersects with the road network 202 or the road segments 204. An intersection 224 represents the point along the road network 202 or the road segments 204 where the crossroad 222 crosses the road network 202 or the road segments 204. For example, the intersection 224 can exist in between two of the road segments 204. The intersection 224 can be within one of the road segments 204.

A traffic controller 226 represents a device or sign that can affect the flow of the traffic. For example, the traffic controller 226 can include a stop sign or a stop light at the intersection 224.

A predefined frequency 228 represents how often the navigation system 100 updates the start window traffic speed 212 and the end window traffic speed 218 within a set time frame. The navigation system 100 updating the start window traffic speed 212 and the end window traffic speed 218 can include the calculation for renewing the start window traffic speed 212 and the end window traffic speed 218. For example, the set time frame can be one minute. Within one minute, the navigation system 100 can update the start window traffic speed 212 and the end window traffic speed 218 five times. As an example, the predefined frequency 228 can be five times per minute.

The predefined frequency 228 can be different between the updating for the start window traffic speed 212 and the end window traffic speed 218. For example, the predefined frequency 228 for updating the start window traffic speed 212 can be five times per minute. The predefined frequency 228 for updating the end window traffic speed 218 can be three times per minute.

A predefined time period 230 represents a duration of time for the navigation system 100 to gather a data sample for averaging the start window traffic speed 212 and the end window traffic speed 218. Continuing from the previous example, the predefined frequency 228 can be five times per minute for updating the start window traffic speed 212 and the end window traffic speed 218.

For example, if the predefined frequency 228 is five times per minute, after twenty minutes, the navigation system 100 can calculate for one hundred calculations for the start window traffic speed 212 and one hundred calculations for the end window traffic speed 218. The one hundred calculations for the start window traffic speed 212 and the end window traffic speed 218 can represent the data sample gathered by the navigation system 100 within twenty minutes. For example, the predefined time period 230 can represent the twenty minutes.

The predefined time period 230 can be different between the calculation for the average speed for the start window traffic speed 212 and the end window traffic speed 218. For example, the predefined time period 230 for calculating the average speed for the start window traffic speed 212 can be twenty minutes. The predefined time period 230 for calculating the average speed for the end window traffic speed 218 can be fifteen minutes.

Figure 3:
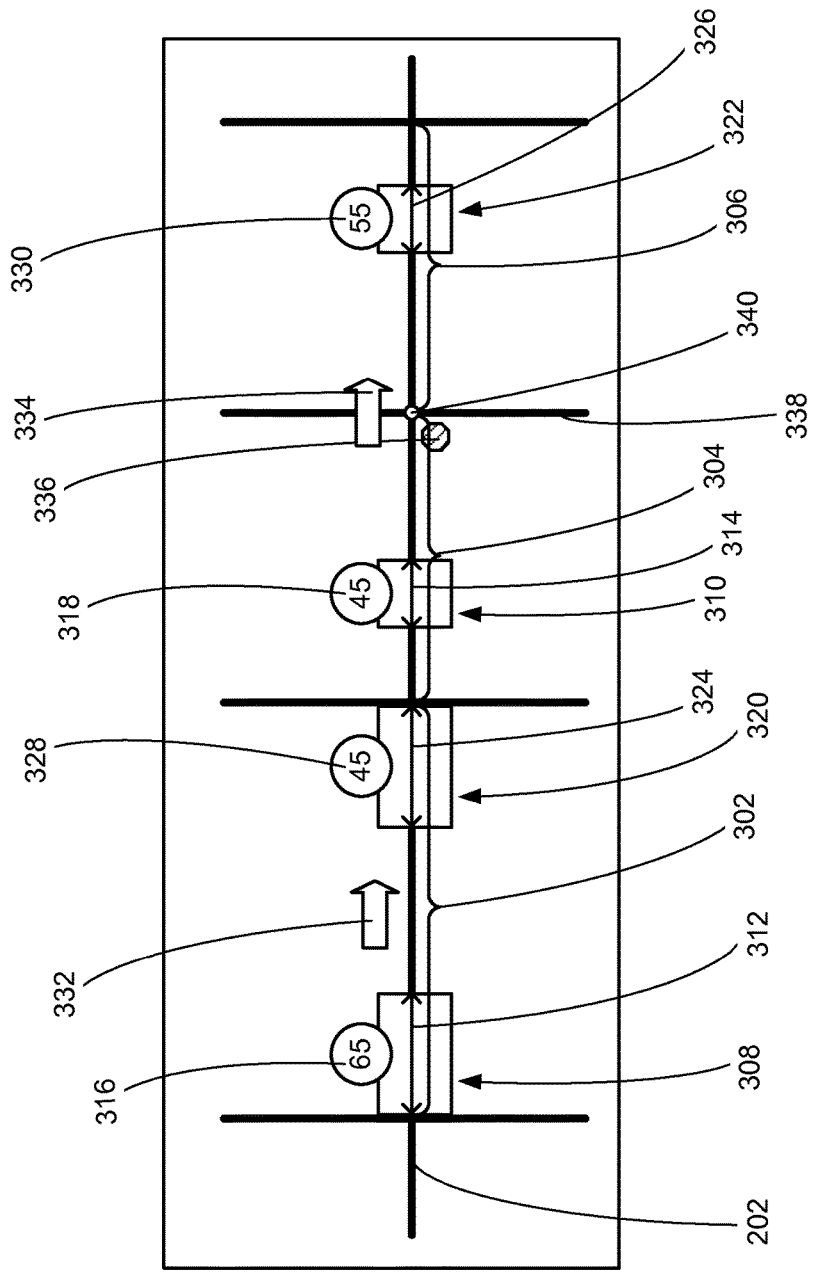
FIG. 3 shows a second example of a geographic view of the application of the navigation system.

Referring now to FIG. 3, therein is shown a second example of a geographic view of the application of the navigation system 100 of FIG. 1. The road segments 204 of FIG. 2 can include a first road segment 302, a second road segment 304, and a third road segment 306. The first road segment 302, the second road segment 304, and the third road segment 306 are further examples of the road segments 204, and are defined as the road segments 204.

The first road segment 302 and the second road segment 304 can include a first start window 308 and a second start window 310, respectively. The first start window 308 and the second start window 310 are further examples of the start window 206 of FIG. 2, and have the same characteristics as the start window 206.

The first start window 308 and the second start window 310 can include a first start window range 312 and a second start window range 314, respectively. The first start window range 312 and the second start window range 314 are further examples of the start window range 210 of FIG. 2, and have the same characteristics as the start window range 210.

A first start window traffic speed 316 and a second start window traffic speed 318 can be measured across the first start window range 312 and the second start window range 314, respectively. The first start window traffic speed 316 and the second start window traffic speed 318 are further examples of the start window traffic speed 212 of FIG. 2, and have the same characteristics as the start window traffic speed 212.

The first road segment 302 and the third road segment 306 can include a first end window 320 and a second end window 322. The first end window 320 and the second end window 322 are further examples of the end window 214 of FIG. 2, and have the same characteristics as the end window 214.

The first end window 320 and the second end window 322 can include a first end window range 324 and a second end window range 326, respectively. The first end window range 324 and the second end window range 326 are further examples of the end window range 216 of FIG. 2, and have the same characteristics as the end window range 216.

A first end window traffic speed 328 and a second end window traffic speed 330 can be measured across the first end window range 324 and the second end window range 326, respectively. The first end window traffic speed 328 and the second end window traffic speed 330 are further examples of the end window traffic speed 218 of FIG. 2, and have the same characteristics as the end window traffic speed 218.

A first traffic flow 332 and a second traffic flow 334 are further examples of the traffic flow 208 of FIG. 2. The first traffic flow 332 and the second traffic flow 334 have the same characteristics as the traffic flow 208 of FIG. 2.

A first traffic controller 336 is a further example of the traffic controller 226. The first traffic controller 336 has the same characteristics as the traffic controller 226 of FIG. 2.

The crossroad 222 of FIG. 2 can include a first crossroad 338. The first crossroad 338 is a further example of the crossroad 222, and has the same characteristics as the crossroad 222 as described in FIG. 2.

A first intersection 340 is a further example of the intersection 224 of FIG. 2, and has the same characteristics as the intersection 224. The first intersection 340 represents the geographic point where the first crossroad 338 and the road network 202 intersects to divide the road network 202 into the second road segment 304 and the third road segment 306.

For example, the first start window traffic speed 316 represents the traffic speed traveling through the first start window 308. The first end window range 324 represents the length of the first end window 320. The first end window traffic speed 328 represents the traffic speed traveling through the first end window 320. The first traffic flow 332 represents the traffic condition of the first road segment 302.

Also for example, the start window 206, the end window 214, or a combination thereof can be placed such that both are not located with one of the road segments 204. For example, the second road segment 304 does not have both the second start window 310 and the second end window 322. Rather, the second road segment 304 can have the second start window 310 and the third road segment 306 can have the second end window 322.

The second start window range 314 represents the length of the second start window 310. The second start window traffic speed 318 represents the traffic speed traveling through the second start window 310. The second end window range 326 represents the length of the second end window 322. The second end window traffic speed 330 represents the traffic speed traveling through the second end window 322.

The traffic flow 208 can represent a traffic condition across a number of the road segments 204. For example, the second traffic flow 334 represents the traffic condition for the second road segment 304 and the third road segment 306.

The traffic flow 208 can also represent a traffic condition for the road network 202 where the crossroad 222 has segmented the road network 202 into more than one of the road segments 204, and the intersection 224 having the traffic controller 226. For example, the second traffic flow 334 represents the traffic condition for the second road segment 304 and the third road segment 306 where the first traffic controller 336 is impacting the flow of the traffic for the second road segment 304 and the third road segment 306. The details regarding the first traffic controller 336 impacting the flow of traffic will be discussed later.

The start window 206 and the end window 214 can be scaled to have different length for the start window range 210 and the end window range 216, respectively. For example, the first start window range 312 can be five kilometers long and the second start window range 314 can be two kilometers long. The first end window range 324 can be five kilometers long and the second end window range 326 can be two kilometers long.

Figure 4:
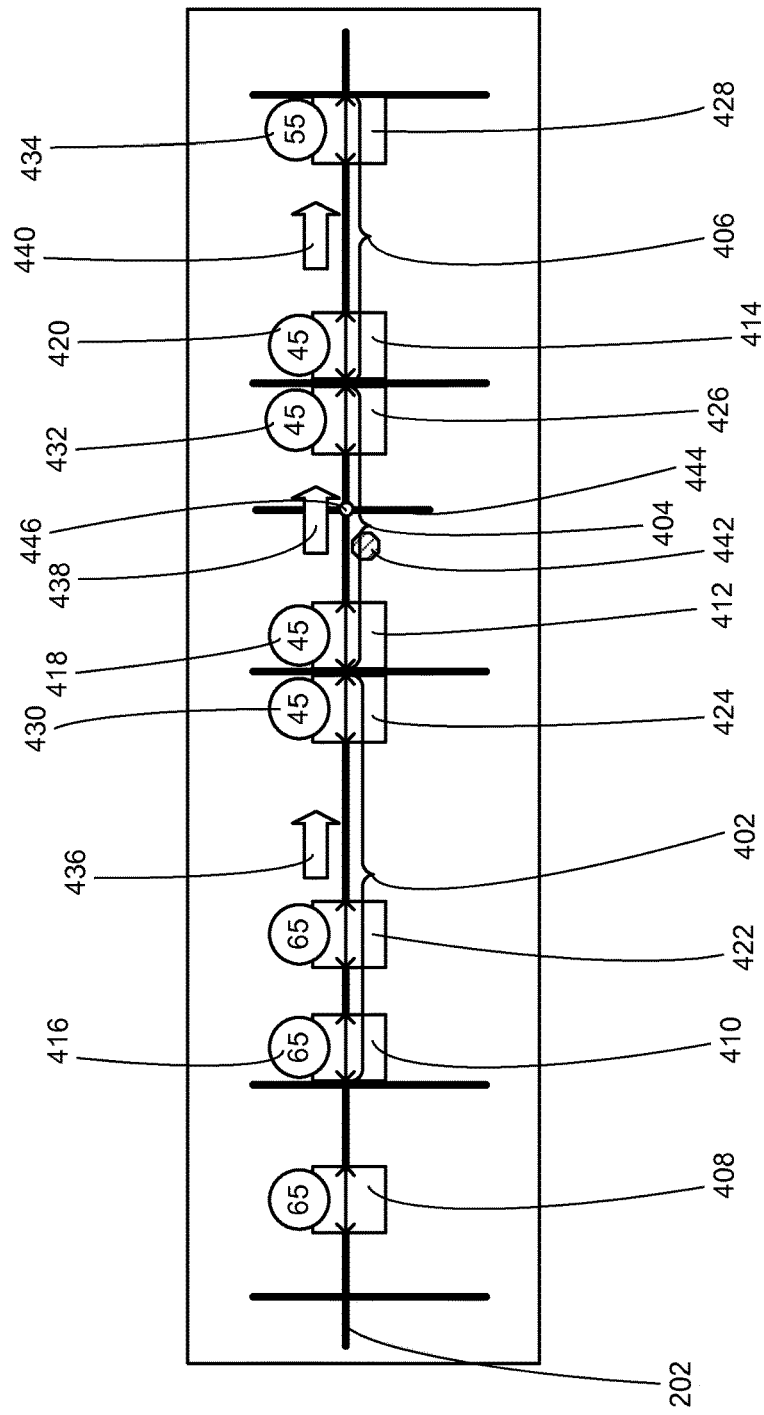
FIG. 4 shows a third example of a geographic view of the application of the navigation system.

Referring now to FIG. 4, therein is shown a third example of a geographic view of the application of the navigation system 100. The road segments 204 of FIG. 2 can include a fourth road segment 402, a fifth road segment 404, and a sixth road segment 406. The fourth road segment 402, the fifth road segment 404, and the sixth road segment 406 are further examples of the road segments 204, and have the same characteristics as the road segments 204.

A third start window 408, a fourth start window 410, a fifth start window 412, and a sixth start window 414 are further examples of the start window 206 of FIG. 2 and have the same characteristics as the start window 206. A fourth start window traffic speed 416, a fifth start window traffic speed 418, and a sixth start window traffic speed 420 are further examples of the start window traffic speed 212 of FIG. 2, and have the same characteristics as the start window traffic speed 212.

The fourth start window traffic speed 416 represents the traffic speed for the fourth start window 410 and the fifth start window traffic speed 418 represents the traffic speed for the fifth start window 412. In this example, the traffic speed for the third start window 408 is not labeled.

A fourth end window 424, a fifth end window 426, and a sixth end window 428 are further examples of the end window 214 of FIG. 2, and have the same characteristics as the end window 214. A fourth end window traffic speed 430, a fifth end window traffic speed 432, and a sixth end window traffic speed 434 are further examples of the end window traffic speed 218 of FIG. 2, and have the same characteristics as the end window traffic speed 218.

The fourth end window traffic speed 430 represents the traffic speed for the fourth end window 424. In this example, the traffic speed for a third end window is not labeled.

A fourth traffic flow 436, a fifth traffic flow 438, and a sixth traffic flow 440 are further examples of the traffic flow 208, and have the same characteristics as the traffic flow 208 of FIG. 2. The fourth traffic flow 436 represents the traffic flow 208 for the fourth road segment 402.

The first traffic controller 336 of FIG. 3 was introduced in FIG. 3. A second traffic controller 442 is a further example of the traffic controller 226 of FIG. 2, and has the same characteristics as the traffic controller 226 as described in FIG. 2.

The first crossroad 338 of FIG. 3 was introduced in FIG. 3. A second crossroad 444 is a further example of the crossroad 222 of FIG. 2, and has the same characteristics as the crossroad 222 as described in FIG. 2.

The first intersection 340 of FIG. 3 was introduced in FIG. 3. A second intersection 446 is a further example of the intersection 224, and has the same characteristics as the intersection 224 of FIG. 2. The second intersection 446 represents the geographic point where the second crossroad 444 and the fifth road segment 404 intersect.

The intersection 224 having the traffic controller 226 can exist within one of the road segments 204. For example, the second intersection 446 having the second traffic controller 442 exists within the fifth road segment 404.

The fourth start window traffic speed 416 represents the traffic speed traveling through the fourth start window 410. The fourth end window traffic speed 430 represents the traffic speed traveling through the fourth end window 424.

The fifth start window traffic speed 418 represents the traffic speed traveling through the fifth start window 412. The fifth end window traffic speed 432 represents the traffic speed traveling through the fifth end window 426.

The sixth start window traffic speed 420 represents the traffic speed traveling through the sixth start window 414. The sixth end window traffic speed 434 represents the traffic speed traveling through the sixth end window 428.

The start window 206 and the end window 214 can overlap each other. For example, a third end window 422 is placed in between the fourth start window 410 and the fourth end window 424. The fourth start window 410 is placed in between the third start window 408 and the third end window 422.

For example, slowdown of the traffic condition induced by the traffic controller 226 may not represent traffic congestion. To disregard the slowdown of the traffic condition induced by the traffic controller 226, the navigation system 100 can extrapolate the traffic flow 208 where the slowdown of the traffic condition is induced.

From the previous example, the fifth road segment 404 can have the second traffic controller 442. The navigation system 100 can extrapolate the fifth traffic flow 438 for the fifth road segment 404 based on the fourth traffic flow 436 and the sixth traffic flow 440. Details regarding the extrapolation of the traffic flow 208 will be discussed later.

Figure 5:
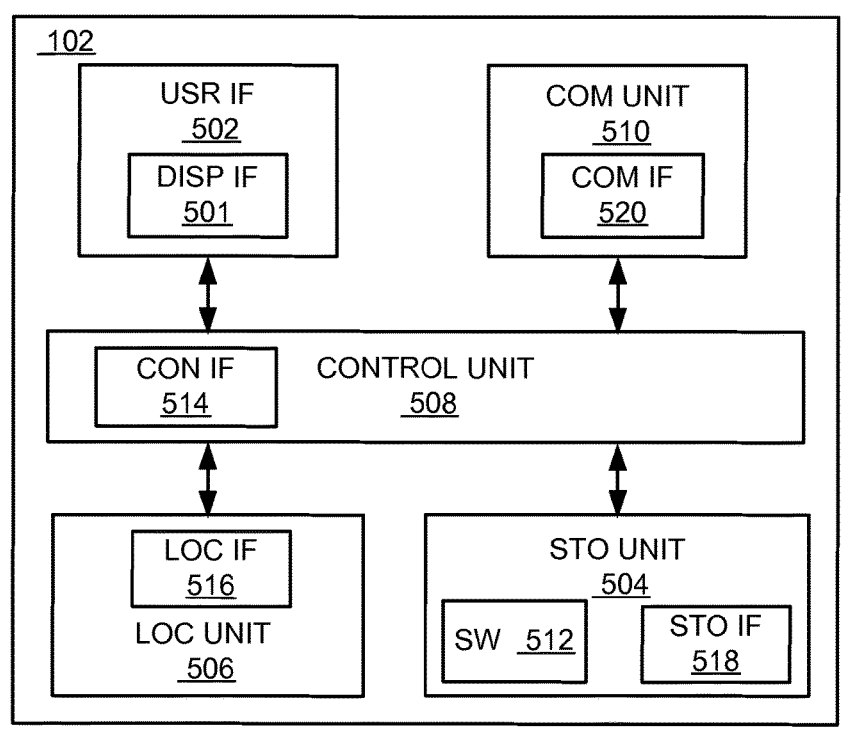
FIG. 5 is an exemplary block diagram of the first device.

Referring now to FIG. 5, therein is shown an exemplary block diagram of the first device 102. The first device 102 can include a user interface 502, a storage unit 504, a location unit 506, a control unit 508, and a communication unit 510.

The user interface 502 allows a user (not shown) to interface and interact with the first device 102. The user interface 502 can include an input device and an output device. Examples of the input device of the user interface 502 can include a keypad, a touchpad, soft-keys, a keyboard, a microphone, or any combination thereof to provide data and communication inputs. Examples of the output device of the user interface 502 can include a display interface 501. The display interface 501 can include a display, a projector, a video screen, a speaker, or any combination thereof.

The control unit 508 can execute a software 512 to provide the intelligence of the navigation system 100. The control unit 508 can operate the user interface 502 to display information generated by the navigation system 100. The control unit 508 can also execute the software 512 for the other functions of the navigation system 100, including receiving location information from the location unit 506. The control unit 508 can further execute the software 512 for interaction with the communication path 104 of FIG. 1 via the communication unit 510.

The control unit 508 can be implemented in a number of different manners. For example, the control unit 508 can be a processor, an embedded processor, a microprocessor, a hardware control logic, a hardware finite state machine (FSM), a digital signal processor (DSP), or a combination thereof.

The control unit 508 can include a controller interface 514. The controller interface 514 can be used for communication between the control unit 508 and other functional units in the first device 102. The controller interface 514 can also be used for communication that is external to the first device 102.

The controller interface 514 can receive information from the other functional units or from external sources, or can transmit information to the other functional units or to external destinations. The external sources and the external destinations refer to sources and destinations external to the first device 102.

The controller interface 514 can be implemented in different ways and can include different implementations depending on which functional units or external units are being interfaced with the controller interface 514. For example, the controller interface 514 can be implemented with a pressure sensor, an inertial sensor, a microelectromechanical system (MEMS), optical circuitry, waveguides, wireless circuitry, wireline circuitry, or a combination thereof.

The location unit 506 can generate location information, current heading, and current speed of the first device 102, as examples. The location unit 506 can be implemented in many ways. For example, the location unit 506 can function as at least a part of a global positioning system (GPS), an inertial navigation system, a cellular-tower location system, a pressure location system, or any combination thereof.

The location unit 506 can include a location interface 516. The location interface 516 can be used for communication between the location unit 506 and other functional units in the first device 102. The location interface 516 can also be used for communication that is external to the first device 102.

The location interface 516 can receive information from the other functional units or from external sources, or can transmit information to the other functional units or to external destinations. The external sources and the external destinations refer to sources and destinations external to the first device 102.

The location interface 516 can include different implementations depending on which functional units or external units are being interfaced with the location unit 506. The location interface 516 can be implemented with technologies and techniques similar to the implementation of the controller interface 514.

The storage unit 504 can store the software 512. The storage unit 504 can also store the relevant information, such as advertisements, points of interest (POI), navigation routing entries, or any combination thereof.

The storage unit 504 can be a volatile memory, a nonvolatile memory, an internal memory, an external memory, or a combination thereof. For example, the storage unit 504 can be a nonvolatile storage such as non-volatile random access memory (NVRAM), Flash memory, disk storage, or a volatile storage such as static random access memory (SRAM).

The storage unit 504 can include a storage interface 518. The storage interface 518 can be used for communication between the location unit 506 and other functional units in the first device 102. The storage interface 518 can also be used for communication that is external to the first device 102.

The storage interface 518 can receive information from the other functional units or from external sources, or can transmit information to the other functional units or to external destinations. The external sources and the external destinations refer to sources and destinations external to the first device 102.

The storage interface 518 can include different implementations depending on which functional units or external units are being interfaced with the storage unit 504. The storage interface 518 can be implemented with technologies and techniques similar to the implementation of the controller interface 514.

The communication unit 510 can enable external communication to and from the first device 102. For example, the communication unit 510 can permit the first device 102 to communicate with the second device 106 of FIG. 1, an attachment, such as a peripheral device or a computer desktop, and the communication path 104.

The communication unit 510 can also function as a communication hub allowing the first device 102 to function as part of the communication path 104 and not limited to be an end point or terminal unit to the communication path 104. The communication unit 510 can include active and passive components, such as microelectronics or an antenna, for interaction with the communication path 104.

The communication unit 510 can include a communication interface 520. The communication interface 520 can be used for communication between the communication unit 510 and other functional units in the first device 102. The communication interface 520 can receive information from the other functional units or can transmit information to the other functional units.

The communication interface 520 can include different implementations depending on which functional units are being interfaced with the communication unit 510. The communication interface 520 can be implemented with technologies and techniques similar to the implementation of the controller interface 514.

For illustrative purposes, the navigation system 100 is shown with the partition having the user interface 502, the storage unit 504, the location unit 506, the control unit 508, and the communication unit 510 although it is understood that the navigation system 100 can have a different partition. For example, the software 512 can be partitioned differently such that some or all of its function can be in the control unit 508, the location unit 506, and the communication unit 510. Also, the first device 102 can include other functional units not shown in FIG. 5 for clarity.

The functional units in the first device 102 can work individually and independently of the other functional units. The first device 102 can work individually and independently from the second device 106 and the communication path 104.

Figure 6:
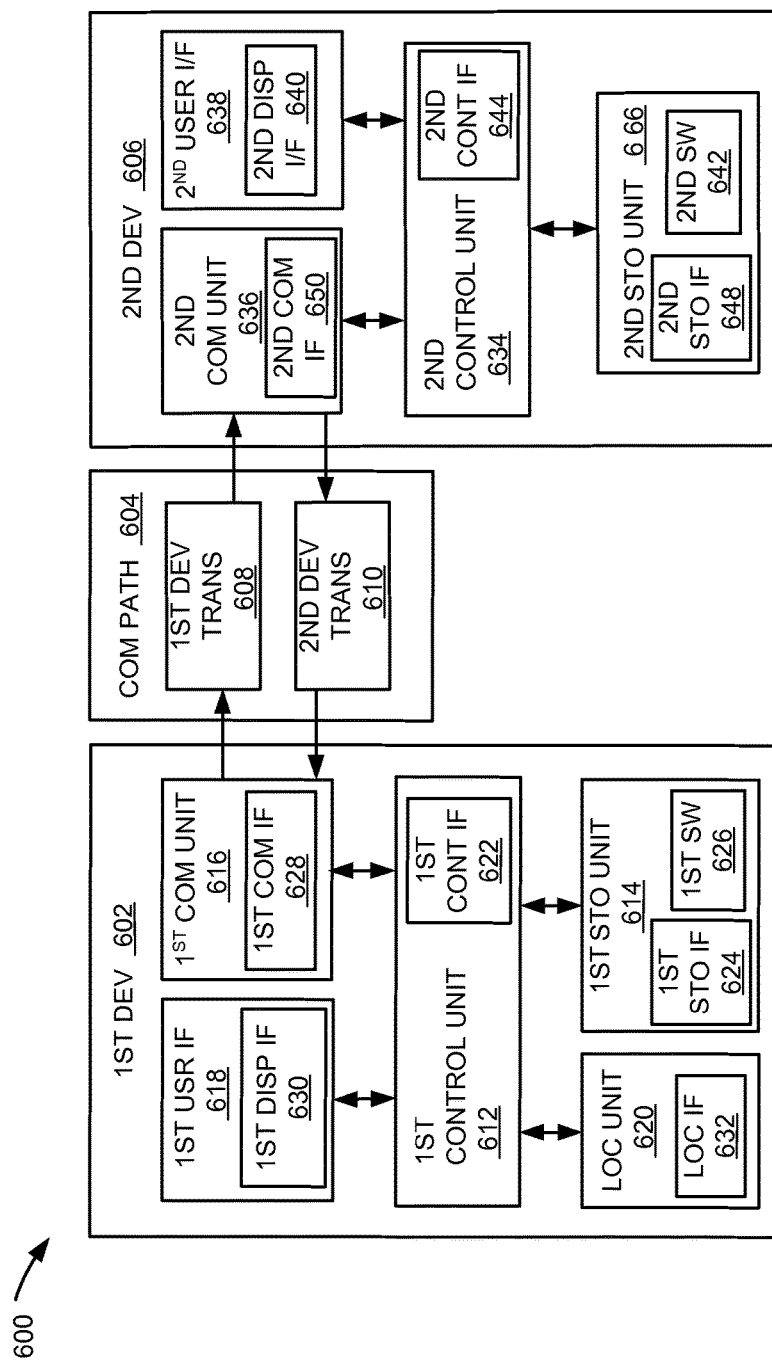
FIG. 6 is an exemplary block diagram of a navigation system with traffic estimation using pipeline scheme mechanism in a second embodiment of the present invention.

Referring now to FIG. 6, therein is shown an exemplary block diagram of a navigation system 600 with traffic estimation using pipeline scheme mechanism in a second embodiment of the present invention. The navigation system 600 can include a first device 602, a communication path 604, and a second device 606.

The first device 602 can communicate with the second device 606 over the communication path 604. For example, the first device 602, the communication path 604, and the second device 606 can be the first device 102 of FIG. 1, the communication path 104 of FIG. 1, and the second device 106 of FIG. 1, respectively. The screen shot shown on the display interface 501 described in FIG. 2 can represent the screen shot for the navigation system 600.

The first device 602 can send information in a first device transmission 608 over the communication path 604 to the second device 606. The second device 606 can send information in a second device transmission 610 over the communication path 604 to the first device 602.

For illustrative purposes, the navigation system 600 is shown with the first device 602 as a client device, although it is understood that the navigation system 600 can have the first device 602 as a different type of device. For example, the first device 602 can be a server.

Also for illustrative purposes, the navigation system 600 is shown with the second device 606 as a server, although it is understood that the navigation system 600 can have the second device 606 as a different type of device. For example, the second device 606 can be a client device.

For brevity of description in this embodiment of the present invention, the first device 602 will be described as a client device and the second device 606 will be described as a server device. The present invention is not limited to this selection for the type of devices. The selection is an example of the present invention.

The first device 602 can include a first control unit 612, a first storage unit 614, a first communication unit 616, a first user interface 618, and a location unit 620. The first device 602 can be similarly described by the first device 102.

The first control unit 612 can include a first control interface 622. The first control unit 612 and the first control interface 622 can be similarly described as the control unit 508 of FIG. 5 and the controller interface 514 of FIG. 5, respectively.

The first storage unit 614 can include a first storage interface 624. The first storage unit 614 and the first storage interface 624 can be similarly described as the storage unit 504 of FIG. 5 and the storage interface 518 of FIG. 5, respectively. A first software 626 can be stored in the first storage unit 614.

The first communication unit 616 can include a first communication interface 628. The first communication unit 616 and the first communication interface 628 can be similarly described as the communication unit 510 of FIG. 5 and the communication interface 520 of FIG. 5, respectively.

The first user interface 618 can include a first display interface 630. The first user interface 618 and the first display interface 630 can be similarly described as the user interface 502 of FIG. 5 and the display interface 501 of FIG. 5, respectively.

The location unit 620 can include a location interface 632. The location unit 620 and the location interface 632 can be similarly described as the location unit 506 of FIG. 5 and the location interface 516 of FIG. 5, respectively.

The performance, architectures, and type of technologies can also differ between the first device 102 and the first device 602. For example, the first device 102 can function as a single device embodiment of the present invention and can have a higher performance than the first device 602. The first device 602 can be similarly optimized for a multiple device embodiment of the present invention.

For example, the first device 102 can have a higher performance with increased processing power in the control unit 508 compared to the first control unit 612. The storage unit 504 can provide higher storage capacity and access time compared to the first storage unit 614.

Also for example, the first device 602 can be optimized to provide increased communication performance in the first communication unit 616 compared to the communication unit 510. The first storage unit 614 can be sized smaller compared to the storage unit 504. The first software 626 can be smaller than the software 512 of FIG. 5.

The second device 606 can be optimized for implementing the present invention in a multiple device embodiment with the first device 602. The second device 606 can provide the additional or higher performance processing power compared to the first device 602. The second device 606 can include a second control unit 634, a second communication unit 636, and a second user interface 638.

The second user interface 638 allows a user (not shown) to interface and interact with the second device 606. The second user interface 638 can include an input device and an output device. Examples of the input device of the second user interface 638 can include a keypad, a touchpad, softkeys, a keyboard, a microphone, or any combination thereof to provide data and communication inputs. Examples of the output device of the second user interface 638 can include a second display interface 640. The second display interface 640 can include a display, a projector, a video screen, a speaker, or any combination thereof.

The second control unit 634 can execute a second software 642 to provide the intelligence of the second device 106 of the navigation system 600. The second software 642 can operate in conjunction with the first software 626. The second control unit 634 can provide additional performance compared to the first control unit 612 or the control unit 508.

The second control unit 634 can operate the second user interface 638 to display information. The second control unit 634 can also execute the second software 642 for the other functions of the navigation system 600, including operating the second communication unit 636 to communicate with the first device 602 over the communication path 604.

The second control unit 634 can be implemented in a number of different manners. For example, the second control unit 634 can be a processor, an embedded processor, a microprocessor, a hardware control logic, a hardware finite state machine (FSM), a digital signal processor (DSP), or a combination thereof.

The second control unit 634 can include a second controller interface 644. The second controller interface 644 can be used for communication between the second control unit 634 and other functional units in the second device 606. The second controller interface 644 can also be used for communication that is external to the second device 606.

The second controller interface 644 can receive information from the other functional units or from external sources, or can transmit information to the other functional units or to external destinations. The external sources and the external destinations refer to sources and destinations external to the second device 606.

The second controller interface 644 can be implemented in different ways and can include different implementations depending on which functional units or external units are being interfaced with the second controller interface 644. For example, the second controller interface 644 can be implemented with a pressure sensor, an inertial sensor, a microelectromechanical system (MEMS), optical circuitry, waveguides, wireless circuitry, wireline circuitry, or a combination thereof.

A second storage unit 646 can store the second software 642. The second storage unit 646 can also store the relevant information, such as advertisements, points of interest (POI), navigation routing entries, or any combination thereof. The second storage unit 646 can be sized to provide the additional storage capacity to supplement the first storage unit 614.

For illustrative purposes, the second storage unit 646 is shown as a single element, although it is understood that the second storage unit 646 can be a distribution of storage elements. Also for illustrative purposes, the navigation system 600 is shown with the second storage unit 646 as a single hierarchy storage system, although it is understood that the navigation system 600 can have the second storage unit 646 in a different configuration. For example, the second storage unit 646 can be formed with different storage technologies forming a memory hierarchal system including different levels of caching, main memory, rotating media, or off-line storage.

The second storage unit 646 can be a volatile memory, a nonvolatile memory, an internal memory, an external memory, or a combination thereof. For example, the second storage unit 646 can be a nonvolatile storage such as non-volatile random access memory (NVRAM), Flash memory, disk storage, or a volatile storage such as static random access memory (SRAM).

The second storage unit 646 can include a second storage interface 648. The second storage interface 648 can be used for communication between the location unit 506 and other functional units in the second device 606. The second storage interface 648 can also be used for communication that is external to the second device 606.

The second storage interface 648 can receive information from the other functional units or from external sources, or can transmit information to the other functional units or to external destinations. The external sources and the external destinations refer to sources and destinations external to the second device 606.

The second storage interface 648 can include different implementations depending on which functional units or external units are being interfaced with the second storage unit 646. The second storage interface 648 can be implemented with technologies and techniques similar to the implementation of the second controller interface 644.

The second communication unit 636 can enable external communication to and from the second device 606. For example, the second communication unit 636 can permit the second device 606 to communicate with the first device 602 over the communication path 604.

The second communication unit 636 can also function as a communication hub allowing the second device 606 to function as part of the communication path 604 and not limited to be an end point or terminal unit to the communication path 604. The second communication unit 636 can include active and passive components, such as microelectronics or an antenna, for interaction with the communication path 604.

The second communication unit 636 can include a second communication interface 650. The second communication interface 650 can be used for communication between the second communication unit 636 and other functional units in the second device 606. The second communication interface 650 can receive information from the other functional units or can transmit information to the other functional units.

The second communication interface 650 can include different implementations depending on which functional units are being interfaced with the second communication unit 636. The second communication interface 650 can be implemented with technologies and techniques similar to the implementation of the second controller interface 644.

The first communication unit 616 can couple with the communication path 604 to send information to the second device 606 in the first device transmission 608. The second device 606 can receive information in the second communication unit 636 from the first device transmission 608 of the communication path 604.

The second communication unit 636 can couple with the communication path 604 to send information to the first device 602 in the second device transmission 610. The first device 602 can receive information in the first communication unit 616 from the second device transmission 610 of the communication path 604. The navigation system 600 can be executed by the first control unit 612, the second control unit 634, or a combination thereof.

For illustrative purposes, the second device 106 is shown with the partition having the second user interface 638, the second storage unit 646, the second control unit 634, and the second communication unit 636, although it is understood that the second device 106 can have a different partition. For example, the second software 642 can be partitioned differently such that some or all of its function can be in the second control unit 634 and the second communication unit 636. Also, the second device 606 can include other functional units not shown in FIG. 6 for clarity.

The functional units in the first device 602 can work individually and independently of the other functional units. The first device 602 can work individually and independently from the second device 606 and the communication path 604.

The functional units in the second device 606 can work individually and independently of the other functional units. The second device 606 can work individually and independently from the first device 602 and the communication path 604.

For illustrative purposes, the navigation system 600 is described by operation of the first device 602 and the second device 606. It is understood that the first device 602 and the second device 606 can operate any of the modules and functions of the navigation system 600. For example, the first device 602 is described to operate the location unit 620, although it is understood that the second device 606 can also operate the location unit 620.

Figure 7:
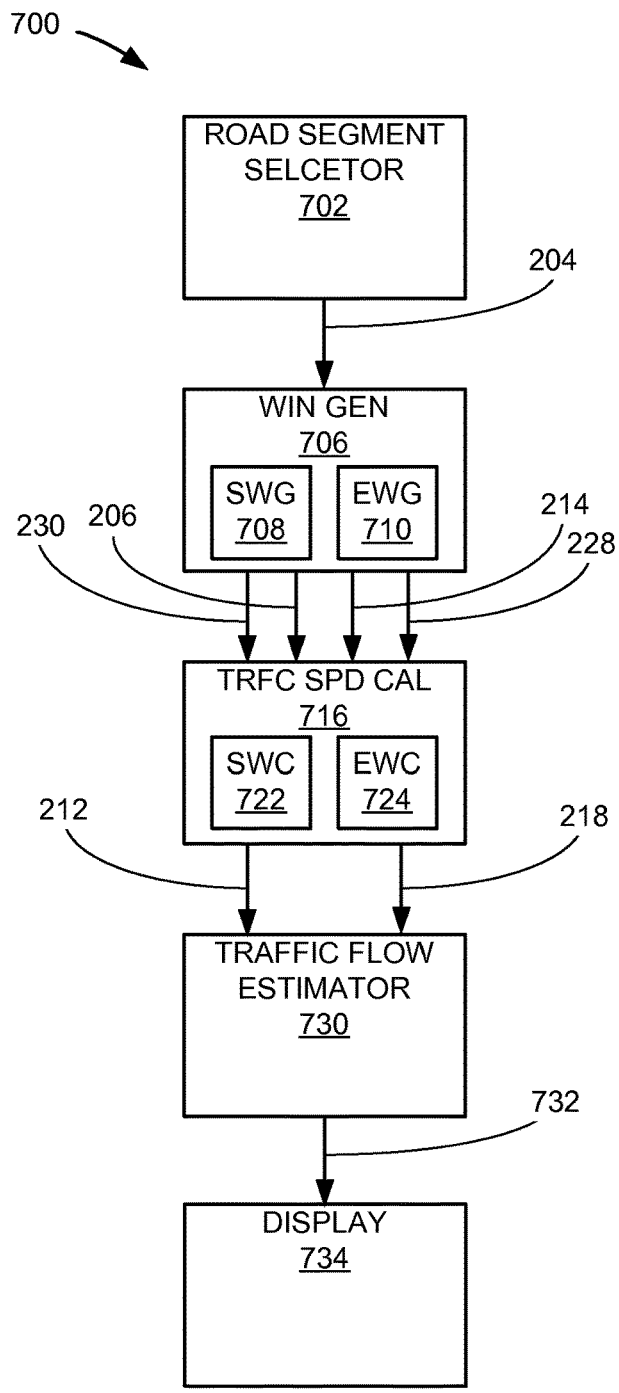
FIG. 7 is a navigation system with traffic estimation using pipeline scheme mechanism in a third embodiment of the present invention.

Referring now to FIG. 7, therein is shown a navigation system 700 with traffic estimation using pipeline scheme mechanism in a third embodiment of the present invention. The navigation system 700 can include a road segment selector module 702. The road segment selector module 702 selects a smaller segment of a path from the path to estimate the flow of the traffic for the smaller segment. For example, the road segment selector module 702 can select the road segments 204 of FIG. 2 from the road network 202 of FIG. 2 to estimate the traffic flow 208 of FIG. 2 for the road segments 204.

The road segment selector module 702 can select the road segments 204 in a number of ways. For example, the road network 202 can represent a highway. The road segment selector module 702 can divide the road network 202 into the road segments 204. Each segment can represent a distance from one exit to another exit of the highway.

For example, the road segment selector module 702 can divide the road network 202 into the first road segment 302 of FIG. 3, the second road segment 304 of FIG. 3, and the third road segment 306 of FIG. 3. The road segment selector module 702 can select the first road segment 302 from the road network 202 to estimate the first traffic flow 332 of FIG. 3.

For example, the road network 202 can represent a local street. The road segment selector module 702 can divide the road network 202 based on cross streets that crosses the road network 202. As a different example, the road segments 204 can represent one block of the street. The road segment selector module 702 can divide the road network 202 into the fourth road segment 402 of FIG. 4. The road segment selector module 702 can select the fourth road segment 402 from the road network 202.

The road segment selector module 702 can select the road segments 204 having the intersection 224 of FIG. 2 and the intersection 224 having the traffic controller 226 of FIG. 2. For example, the road segment selector module 702 can divide the road network 202 with the road segments 204 having the intersection 224. For example, the road segment selector module 702 can select the fifth road segment 404 having the second intersection 446 from the road network 202. The road segment selector module 702 can send the first road segment 302, the fourth road segment 402, the fifth road segment 404, or the combination thereof as the road segments 204 to a window generator module 706.

The navigation system 700 can include the window generator module 706. The window generator module 706 generates a predefined range along the road segments 204 for calculating the traffic speed for the road segments 204. For example, the window generator module 706 can generate the start window 206 of FIG. 2 and the end window 214 of FIG. 2 for the road segments 204 for calculating the start window traffic speed 212 of FIG. 2 and the end window traffic speed 218 of FIG. 2.

The window generator module 706 can generate the start window 206 and the end window 214 in a number of ways. For example, the window generator module 706 can generate the start window 206 having the start window range 210 of FIG. 2 and the end window 214 having the end window range 216 of FIG. 2. The window generator module 706 can set the start window range 210 and the end window range 216 both at 2 kilometers.

The window generator module 706 can include a start window generator module 708. The start window generator module 708 scales the range of the start window 206. For example, the start window generator module 708 can generate the start window 206 by scaling the start window range 210 by setting the start window range 210 longer or shorter.

The start window generator module 708 can increase the start window range 210 to improve accuracy for the estimation of the traffic flow 208 and decrease the start window range 210 to reduce computation burden by the navigation system 700. For example, one way to calculate the traffic speed is to track the speed of the vehicle traveling through the entire length of the start window range 210. The tracking of the vehicle can be computationally less burdensome if the start window range 210 is shorter rather than longer, because the navigation system 700 can stop tracking the vehicle once the vehicle leaves the start window range 210. The details regarding improving accuracy of the estimation and decreasing computation burden will be discussed later.

The window generator module 706 can include an end window generator module 710. The end window generator module 710 scales the range of the end window 214. For example, the end window generator module 710 can generate the end window 214 by scaling the end window range 216 by setting the end window range 216 longer or shorter.

The end window generator module 710 can increase the end window range 216 to improve accuracy for the estimation of the traffic flow 208 and decrease the end window range 216 to reduce computation burden by the navigation system 700. The details regarding the explanation for reduction of computation burden is as discussed previously for the start window range 210. The details regarding improving accuracy of the estimation and decreasing computation burden will be discussed later.

The window generator module 706 can generate the start window 206 and the end window 214 by scaling the location of the start window 206 and the end window 214 along the road segments 204. For example, the window generator module 706 can generate the start window 206 and the end window 214 within the one of the road segments 204. As a more specific example, the window generator module 706 can generate the first start window 308 of FIG. 3 and the first end window 320 of FIG. 3 within the first road segment 302.

The window generator module 706 can generate the start window 206 and the end window 214 where one of the road segments 204 not having both the start window 206 and the end window 214. For example, the window generator module 706 can generate the second start window 310 of FIG. 3 along the second road segment 304 and the second end window 322 of FIG. 3 along the third road segment 306.

The window generator module 706 can generate the start window 206 and the end window 214 overlapping one another. For example, the window generator module 706 can place the third start window 408 of FIG. 4 before the fourth start window 410 of FIG. 4 along the road network 202. The window generator module 706 can place the third end window 422 of FIG. 4 in between the fourth start window 410 and the fourth end window 424 of FIG. 4. The window generator module 706 can send the start window 206 and the end window 214 to a traffic speed calculator module 716.

For illustrative purposes, the navigation system 700 is described with the window generator module 706 generating the start window 206, the end window 214, or the combination thereof, although it is understood that the navigation system 700 can operate the window generator module 706 differently. For example, the window generator module 706 can generate the predefined time period 230 of FIG. 2.

The window generator module 706 can generate the predefined time period 230 in a number of ways. For example, the user can manually enter the value of the predefined time period 230 as twenty minutes. Also as an example, the user can upload the value of the predefined time period 230 from a data file into the window generator module 706. The window generator module 706 can set the predefined time period 230. The window generator module 706 can adjust the predefined time period 230 to improve the accuracy of the navigation system 700, to reduce the computation load on the navigation system 700, or a combination thereof.

For example, the window generator module 706 can automatically set the value of the predefined time period 230 based on the time of the day. The window generator module 706 can set the value of the predefined time period 230 for 40 minutes out of the one hour during the rush hour. If the predefined time period 230 was set at 5 minutes out of one hour during the rush hour, the traffic condition can be different for the remaining 55 minutes out of the hour. Having a longer value for the predefined time period 230 during a rush hour, the navigation system 700 can average the start window traffic speed 212 with a larger sample of the calculations for the start window traffic speed 212 to reflect the real time traffic speed more accurately.

In contrast, the window generator module 706 can set the value of the predefined time period 230 for 5 minutes during the non-rush hour. For example, having a shorter value for the predefined time period 230 during the non-rush hour, the navigation system 700 can calculate the start window traffic speed 212 less frequently to minimize processing burden to the navigation system 700. The window generator module 706 can send the predefined time period 230 to the traffic speed calculator module 716.

For illustrative purposes, the navigation system 700 is described with the window generator module 706 generating the predefined time period 230, although it is understood that the navigation system 700 can operate the window generator module 706 differently. For example, the window generator module 706 can generate the predefined frequency 228 of FIG. 2.

The window generator module 706 can generate the predefined frequency 228 in a number of ways. For example, the user can manually enter the value of the predefined frequency 228 as 5 times per minute. The window generator module 706 can set the predefined frequency 228 or adjust the predefined frequency 228 to improve the accuracy of the navigation system 700, to reduce the computation load on the navigation system 700, or a combination thereof.

For example, the window generator module 706 can automatically set the value of the predefined frequency 228 based on the time of the day. Also for example, the navigation system 700 can set the value of the predefined frequency 228 at 20 times per minute during the rush hour to update the start window traffic speed 212 more frequently.

In contrast, the window generator module 706 can set the value of the predefined frequency 228 at 1 time per every 10 minutes during the non-rush hour to minimize processing burden to the navigation system 700. The window generator module 706 can send the predefined frequency 228 to the traffic speed calculator module 716.

The navigation system 700 can include the traffic speed calculator module 716. The traffic speed calculator module 716 calculates the traffic speed inside the start window 206, the end window 214, or a combination thereof.

The traffic speed calculator module 716 can include a start window calculator module 722. The start window calculator module 722 calculates the speed of traffic within the start window 206. For example, the start window calculator module 722 can calculate the start window traffic speed 212 for the start window 206.

The start window calculator module 722 can calculate the start window traffic speed 212 in a number of ways. For example, the start window calculator module 722 can calculate the start window traffic speed 212 based on how much time the vehicle took to travel the distance of the start window range 210. As a more specific example, the first start window range 312 of FIG. 3 can be 2 kilometers. The vehicle can take two minutes and ten seconds to travel the first start window range 312. Accordingly, the vehicle can travel at 65 kilometers per hour to complete traveling through the first start window 308 of FIG. 4.

The start window calculator module 722 can calculate the start window traffic speed 212 based on the predefined time period 230. For example, the start window calculator module 722 can calculate the start window traffic speed 212 by averaging the start window traffic speed 212 within the predefined time period 230.

For example, the predefined time period 230 can be 20 minutes. The start window calculator module 722 can calculate the start window traffic speed 212 for one hundred times within the 20 minutes based on the predefined frequency 228 of five minutes per minute. The start window calculator module 722 can calculate the start window traffic speed 212 by averaging the 100 calculations of the start window traffic speed 212. As a more specific example, 65 kilometers for the fourth start window traffic speed 416 of FIG. 4 represents the average of the 100 calculations for the fourth start window traffic speed 416 within the predefined time period 230 of 20 minutes.

The traffic speed calculator module 716 can include an end window calculator module 724. The end window calculator module 724 calculates the speed of traffic within the end window 214. For example, the end window calculator module 724 can calculate the end window traffic speed 218 for the end window 214.

The end window calculator module 724 can calculate the end window traffic speed 218 based on the same algorithm for calculating the start window traffic speed 212. For example, the end window calculator module 724 can calculate the end window traffic speed 218 based on the time the vehicle took to travel the distance of the end window range 216. The end window calculator module 724 can calculate the end window traffic speed 218 by averaging the end window traffic speed 218 within the predefined time period 230.

The traffic speed calculator module 716 can calculate the speed of traffic within the start window 206 and the end window 214 by extrapolation. For example, the start window calculator module 722 can calculate the start window traffic speed 212 by extrapolating for the start window traffic speed 212. As a more specific example, the fifth start window traffic speed 418 of FIG. 4 for the fifth road segment 404 of FIG. 4 can be unknown. The fourth end window 424 of FIG. 4 and the fifth start window 412 of FIG. 4 can be adjacent to each other. As an example, the fourth end window traffic speed 430 of FIG. 4 can be 45 kilometers per hour. Based on the fourth end window traffic speed 430, the traffic speed calculator module 716 can extrapolate the fifth start window traffic speed 418 to be 45 kilometers per hour also.

The end window calculator module 724 can calculate the end window traffic speed 218 by extrapolating for the end window traffic speed 218. For example, the fifth end window traffic speed 432 of FIG. 4 for the fifth road segment 404 can be unknown. The sixth start window 414 of FIG. 4 and the fifth end window 426 of FIG. 4 can be adjacent to each other. As an example, the sixth start window traffic speed 420 of FIG. 4 can be 65 kilometers per hour. Based on the sixth start window traffic speed 420, the traffic speed calculator module 716 can extrapolate the fifth end window traffic speed 432 to be 65 kilometers per hour also.

For illustrative purposes, the navigation system 700 is described with the traffic speed calculator module 716 calculating for the start window traffic speed 212 and the end window traffic speed 218, although it is understood that the navigation system 700 can operate the traffic speed calculator module 716 differently. For example, the traffic speed calculator module 716 can update the start window traffic speed 212 and the end window traffic speed 218 based on the predefined frequency 228.

The traffic speed calculator module 716 can update the start window traffic speed 212 and the end window traffic speed 218 based on the predefined frequency 228 in a number of ways. For example, the traffic speed calculator module 716 can update the start window traffic speed 212 and the end window traffic speed 218 based on time of the day.

The user can demand for real time traffic condition information during the rush hour. The traffic speed calculator module 716 can update the start window traffic speed 212 and the end window traffic speed 218 based on the predefined frequency 228 of 20 times per minute, as an example, during the rush hour to deliver the traffic condition information to the user more frequently.

In contrast, the user may not demand as urgently for traffic condition information during a non-rush hour. The traffic speed calculator module 716 can update the start window traffic speed 212 and the end window traffic speed 218 less frequently. The predefined frequency 228 can be one time per ten minutes during the non-rush hour. The traffic speed calculator module 716 can send the start window traffic speed 212 and the end window traffic speed 218 to a traffic flow estimator module 730.

The navigation system 700 can include the traffic flow estimator module 730. The traffic flow estimator module 730 estimates the flow of the traffic along the one of the road segments 204 or across a number of the road segments 204 of a path. For example, the traffic flow estimator module 730 can estimate the traffic flow 208 of the road segments 204 based on the start window traffic speed 212 and the end window traffic speed 218 for displaying on the first device 102, the first device 602 of FIG. 6, the second device 106 of FIG. 1, or the second device 606 of FIG. 6.

The traffic flow estimator module 730 can estimated the traffic flow 208 in a number of ways. For example, the traffic flow estimator module 730 can estimate the traffic flow 208 based on the start window traffic speed 212 and the end window traffic speed 218. Estimating the traffic flow 208 includes checking the start window traffic speed 212 and the end window traffic speed 218 within the time frame 220 of FIG. 2.

For example, the time frame 220 can be immediate. The traffic flow estimator module 730 can check the end window traffic speed 218 immediately after checking the start window traffic speed 212. If the vehicle exits the one of the road segments 204 that is being analyzed with faster speed than entering the particular one of the road segments 204, the traffic flow estimator module 730 can estimate that there is no traffic for the road segments 204.

As a more specific example, the fourth start window traffic speed 416 of FIG. 4 can be 45 kilometers per hour and the fourth end window traffic speed 430 of FIG. 4 can be 55 kilometers per hour. Based on the fourth start window traffic speed 416 and the fourth end window traffic speed 430, the traffic flow estimator module 730 can estimate the fourth traffic flow 436 of FIG. 4 to be no traffic for the fourth road segment 402 of FIG. 4. No traffic represents no traffic congestion that can constrain the flow or speed of traffic moving through the particular one of the road segments 204 being analyzed.

For a further example, when the start window traffic speed 212 and the end window traffic speed 218 are equal, the traffic flow estimator module 730 can estimate the traffic flow 208 to be no traffic. As a more specific example, when the start window traffic speed 212 and the end window traffic speed 218 are equal, the traffic flow estimator module 730 can estimate the speed of the traffic for the road segments 204 to be equivalent to the start window traffic speed 212 and the end window traffic speed 218.

In contrast, the first start window traffic speed 316 of FIG. 3 can be 65 kilometers per hour and the first end window traffic speed 328 of FIG. 3 can be 45 kilometers per hour. Unlike the previous example, the first start window traffic speed 316 is greater than the first end window traffic speed 328. The traffic flow estimator module 730 can estimate the first traffic flow 332 of FIG. 3 to be a traffic jam.

The degree of the traffic jam can be based on the size of discrepancy between the start window traffic speed 212 and the end window traffic speed 218. For example, the fourth start window traffic speed 416 is one hundred kilometers per hour and the fourth end window traffic speed 430 is 25 kilometers per hour. Also for example, the sixth start window traffic speed 420 of FIG. 4 is 70 kilometers per hour and the sixth end window traffic speed 434 of FIG. 4 is 65 kilometers per hour. Based on comparing the fourth start window traffic speed 416 and the fourth end window traffic speed 430 to the sixth start window traffic speed 420 and the sixth end window traffic speed 434, the traffic condition for the fourth traffic flow 436 of FIG. 4 will be heavier traffic jam than that indicated by the sixth traffic flow 440 of FIG. 4.

For illustrative purposes, the navigation system 700 is described with the traffic flow estimator module 730 estimating the traffic flow 208 in the road segments 204, although it is understood that the navigation system 700 can operate the traffic flow estimator module 730 differently. For example, the traffic flow estimator module 730 can estimate the traffic flow 208 that spans a number of the road segments 204.

For example, the second start window 310 of FIG. 3 can be located on the second road segment 304 of FIG. 3. The second end window 322 of FIG. 3 can be located on the third road segment 306 of FIG. 3. The traffic flow estimator module 730 can estimate the second traffic flow 334 of FIG. 3 for the second road segment 304 and the third road segment 306 based on the second start window traffic speed 318 of FIG. 3 and the second end window traffic speed 330 of FIG. 3.

The navigation system 700 can alleviate computation burden from estimating the traffic flow 208 by placing the start window 206 and the end window 214 across more than one of the road segments 204. For example, the second road segment 304 and the third road segment 306 can be located in a remote area where the traffic condition for the second traffic flow 334 changes minimally.

If the start window 206 and the end window 214 are placed in short segments, the traffic flow estimator module 730 can estimate for the traffic flow 208 based on each of the start window traffic speed 212 and the end window traffic speed 218 for each of the road segments 204. For example, the fourth road segment 402, the fifth road segment 404, and the sixth road segment 406 can represent the road segments 204 that are short.

Continuing from the previous example, the traffic flow estimator module 730 can estimate the fourth traffic flow 436 for the fourth road segment 402, the fifth traffic flow 438 for the fifth road segment 404, and the sixth traffic flow 440 for the sixth road segment 406. The aggregation of the fourth traffic flow 436, the fifth traffic flow 438, and the sixth traffic flow 440 can represent the traffic flow 208 for the a number of the road segments 204 that include the fourth road segment 402, the fifth road segment 404, and the sixth road segment 406. As shown in the example, the navigation system 700 can require more computation resources to aggregate the traffic flow 208 from each of the road segments 204 in order to estimate the traffic flow 208 for a number of the road segments 204.

In contrast, if the start window 206 and the end window 214 are placed spanning over a number of the road segments 204, the traffic flow estimator module 730 can estimate for the traffic flow 208 based on fewer number of the start window traffic speed 212 and the end window traffic speed 218. For example, the traffic flow estimator module 730 can estimate the second traffic flow 334 based on the second start window traffic speed 318 and the second end window traffic speed 330. When the traffic flow 208 changes minimally, placing the start window 206 and the end window 214 across a number of the road segments 204 can save computation burden for the navigation system 700 for estimating the traffic flow 208.

The navigation system 700 can increase the accuracy for the estimation of the traffic flow 208 by extending the start window range 210 and the end window range 216. For example, the first road segment 302 can be 50 kilometers. The first start window range 312 and the first end window range 324 of FIG. 3 can be 5 kilometers each. The first start window traffic speed 316 and the first end window traffic speed 328 can be based on the 5 kilometers. The traffic flow estimator module 730 can estimate the first traffic flow 332 based on the first start window traffic speed 316 and the first end window traffic speed 328 that covers 10 kilometers out of the 50 kilometers.

In contrast, if the start window range 210 and the end window range 216 are longer, the estimation of the traffic flow 208 can be more accurate. For example, the first start window range 312 and the first end window range 324 of FIG. 3 can be 20 kilometers each. The first start window traffic speed 316 and the first end window traffic speed 328 can be based on the 20 kilometers. The traffic flow estimator module 730 can estimate the first traffic flow 332 based on the first start window traffic speed 316 and the first end window traffic speed 328 that cover 40 kilometers out of the 50 kilometers. The estimation of the traffic flow 208 will be more accurate based on 40 kilometers out of the 50 kilometers than 10 out of the 50 kilometers.

The shorter range for the start window range 210 and the end window range 216 can decrease the computation burden by the navigation system 700. For example, if the start window range 210 is 10 kilometers long, the navigation system 700 can track the vehicle for the entire 10 kilometers to calculate the start window traffic speed 212. In contrast, if the start window range 210 is 1 kilometer long, the navigation system 700 can track the vehicle for just 1 kilometer to calculate for the start window traffic speed 212. Tracking lesser distance of the vehicle can alleviate the computation burden by the navigation system 700.

Also for illustrative purposes, the navigation system 700 is described with the traffic flow estimator module 730 estimating the traffic flow 208 for the road segments 204 without the intersection 224 of FIG. 2 having the traffic controller 226 of FIG. 2, although it is understood that the navigation system 700 can operate the traffic flow estimator module 730 differently. For example, the traffic flow estimator module 730 can estimate the traffic flow 208 for the road segments 204 having the intersection 224 and the intersection 224 having the traffic controller 226.

The traffic flow estimator module 730 can estimate the traffic flow 208 for the road segments 204 having the intersection 224 and the intersection 224 having the traffic controller 226 in a number of ways. For example, the traffic flow estimator module 730 can disregard the start window traffic speed 212, the end window traffic speed 218, or a combination thereof when the traffic controller 226 stops the traffic flow 208 through the intersection 224.

As a more specific example, the first traffic controller 336 of FIG. 3 can be a stop light. The traffic flow estimator module 730 can store the information for the schedule of the first traffic controller 336 stopping the second traffic flow 334 based on the time of the day. For example, accounting for the speed decrease can be an inaccurate estimation for the second traffic flow 334 as a traffic jam, because the slowdown of the traffic is not caused by traffic congestion but the first traffic controller 336 controlling the flow of the traffic. The traffic flow estimator module 730 can disregard the second start window traffic speed 318 and the second end window traffic speed 330 when the first traffic controller 336 stops the second traffic flow 334 traveling through the first intersection 340 of FIG. 3 based on the schedule of the first traffic controller 336 to accurately estimate for the second traffic flow 334.

In another example, the second traffic controller 442 of FIG. 4 can be a stop sign. For example, the traffic flow estimator module 730 can extrapolate the fifth traffic flow 438 based on the fourth traffic flow 436 and the sixth traffic flow 440. The fourth traffic flow 436 can be heavy traffic jam. The sixth traffic flow 440 can be no traffic. Based on the fourth traffic flow 436 and the sixth traffic flow 440, the traffic flow estimator module 730 can extrapolate the fifth traffic flow 438 to be less traffic jam than the fourth traffic flow 436 or more traffic jam than the sixth traffic flow 440. The traffic flow estimator module 730 can send the fifth traffic flow 438 as a generated traffic flow 732 to a display module 734.

The navigation system 700 can include the display module 734. The display module 734 displays the traffic flow 208 estimated by the traffic flow estimator module 730. For example, the display module 734 can display the fifth traffic flow 438 on the display interface 501 of FIG. 2 based on the generated traffic flow 732.

The physical transformation from estimating the traffic flow 208 results in movement in the physical world, such as people using the first device 102 of FIG. 1, the first device 602 of FIG. 6, the vehicle, or a combination thereof, based on the operation of the navigation system 700. As the movement in the physical world occurs, the movement itself creates additional information that is converted back to the traffic flow 208 for the continued operation of the navigation system 700 and to continue the movement in the physical world.

The software 512 of FIG. 5 can include the navigation system 700. For example, the software 512 can include the road segment selector module 702, the window generator module 706, the traffic speed calculator module 716, and the traffic flow estimator module 730.

The control unit 508 of FIG. 5 can execute the software 512 to operate the communication unit 510 of FIG. 5 and the location unit 506 of FIG. 5. The control unit 508 can execute the software 512 to execute the road segment selector module 702 to select the road segments 204 from the road network 202. The control unit 508 can execute the software 512 to execute the window generator module 706 to generate the start window 206 and the end window 214. The control unit 508 can execute the software 512 to execute the traffic speed calculator module 716 to calculate the start window traffic speed 212 and the end window traffic speed 218. The control unit 508 can execute the software 512 to execute the traffic flow estimator module 730 to estimate the traffic flow 208. The traffic flow 208 can be displayed on the display interface 501 of FIG. 2.

The navigation system 700 can be partitioned between the first device 602 of FIG. 6 and the second device 606 of FIG. 6. For example, the navigation system 700 can be partitioned into the functional units of the first device 602, the second device 606, or a combination thereof. The navigation system 700 can also be implemented as additional functional units in the first device 102 of FIG. 1, the first device 602, the second device 606, or a combination thereof.

As another example, the navigation system 700 can be partitioned between the first software 626 of FIG. 6 and the second software 642 of FIG. 6. For example, the second software 642 can include the window generator module 706, the traffic speed calculator module 716, and the traffic flow estimator module 730. The second control unit 634 of FIG. 6 can execute modules partitioned on the second software 642.

The first software 626 can include the road segment selector module 702 and the display module 734. Based on the size of the first storage unit 614 of FIG. 6, the first software 626 can include additional modules of the navigation system 700. The first control unit 612 of FIG. 6 can execute the modules partitioned on the first software 626.

The road segments 204 can be selected by operating the first control unit 612 or the second control unit 634. The first control unit 612 can operate the first communication unit 616 of FIG. 6 to send the road segments 204 to the second device 606.

The second communication unit 636 of FIG. 6 can send the traffic flow 208 to the first device 602 through the communication path 604 of FIG. 6. The traffic flow 208 can be displayed on the first user interface 618 of FIG. 6 or the second user interface 638 of FIG. 6.

It has been discovered that the present invention provides the navigation system 700 for accurately estimating traffic while reducing computing processing needs. The navigation system 700 estimates the traffic flow 208 by calculating a traffic speed within the start window 206 and the end window 214 along the road segments 204 to aid the user to make decisions traveling along the road network 202. The selective placement of the start window 206 and the end window 214 along the road network 202 allows flexibility to how much and where to monitor traffic. The scaling of the start window 206 and the end window 214 also allows reduction of processing speed while adjusting for accuracy of the estimated traffic speeds. The adjustments to the predefined window and the predefined frequency also allows to either reduce computing processing needs or improve accuracy of the estimated traffic. The navigation system estimating the traffic flow 208 for the road segments 204 having the intersection 224 and the intersection 224 having the traffic controller 226 can aid the user by accurately presenting the traffic condition of the road segments 204.

The navigation system 700 describes the module functions or order as an example. The modules can be partitioned differently. For example, the traffic speed calculator module 716 and the traffic flow estimator module 730 can be combined. Each of the modules can operate individually and independently of the other modules.

Figure 8:
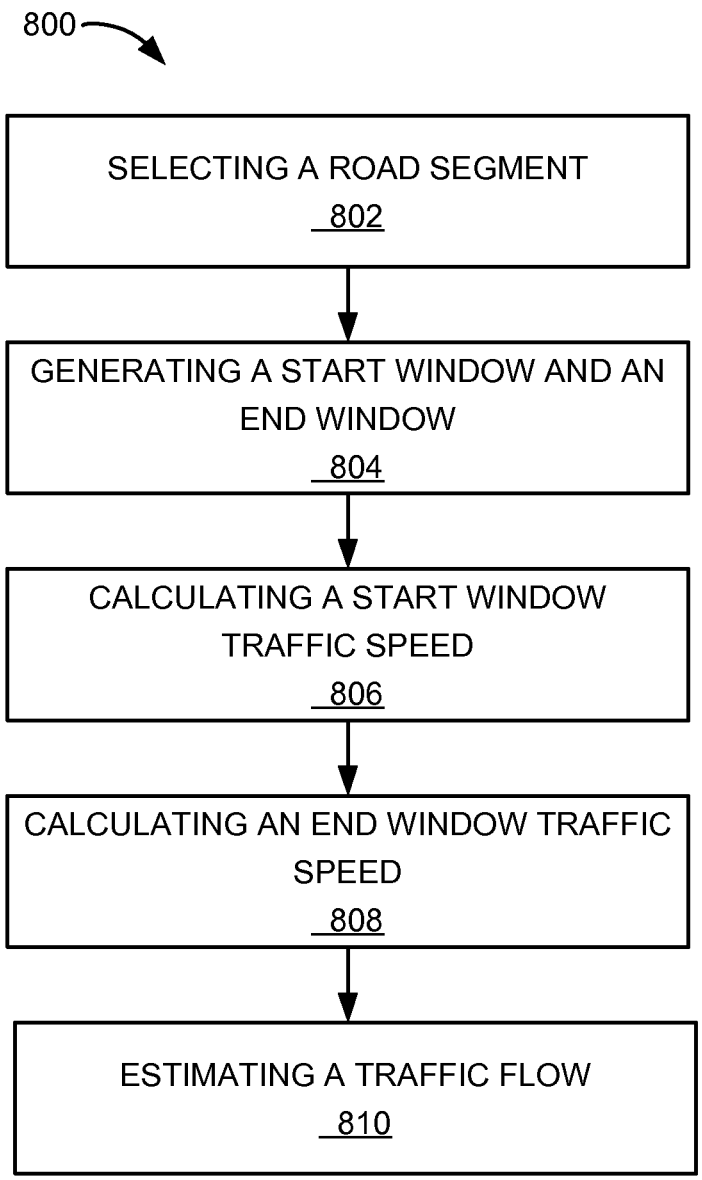
FIG. 8 is a flow chart of a method of operation of the navigation system in a further embodiment of the present invention.

Referring now to FIG. 8, therein is shown a flow chart of a method 800 of operation of the navigation system 100 in a further embodiment of the present invention. The method 800 includes: selecting a road segment from a road network in a block 802; generating a start window and an end window for the road segment in a block 804; calculating a start window traffic speed for the start window in a block 806; calculating an end window traffic speed for the end window in a block 808; and estimating a traffic flow of the road segment based on the start window traffic speed and the end window traffic speed for displaying on a device in a block 810.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   selecting a road segment by portioning a road network including multiple road segments;
   generating a start window including a start window range at the road segment;
   generating an end window including an end window range, with a control unit executing a software, at the road segment wherein the start window and the end window are independent from one another within the road segment;
   scaling the start window range for changing a distance to monitor a vehicle within the start window by the control unit including a controller interface to receive and transmit, with an external source, information representing a traffic speed of the vehicle within the start window;
   scaling the end window range for changing the distance to monitor the vehicle within the end window by the control unit including the controller interface to receive and transmit with an external source, information representing the traffic speed of the vehicle within the end window;
   adjusting a predefined time period in real time for changing a duration of time to change a sample size of data to be gathered;
   calculating a start window traffic speed based on the predefined time period for traveling within the start window range of the start window;
   calculating an end window traffic speed based on the predefined time period for traveling within the end window range of the end window wherein the predefined time period for calculating the end window traffic speed different from the predefined time period for calculating the start window traffic speed;
   updating the start window traffic speed at a predefined frequency different from the predefined frequency for updating the end window traffic speed wherein the predefined frequency representing how many number of times the start window traffic speed or the end window traffic speed is updated within the predefined time period, wherein the predefined frequency is dynamically updated based on a time of day;
   estimating a traffic flow of the road segment based on a discrepancy between the start window traffic speed and the end window traffic speed; and
   transmitting the traffic flow for displaying on a device by a further control unit operating a user interface.

2. The method as claimed in claim 1 wherein generating the start window and the end window includes scaling the start window, the end window, or a combination thereof for selecting the location of the start window, the end window, or a combination thereof along the road segment.

3. The method as claimed in claim 1 wherein generating the start window includes:
   generating the start window having the start window range; and
   scaling the start window range.

4. The method as claimed in claim 1 wherein generating the end window includes:
   generating the end window having the end window range; and
   scaling the end window range.

5. The method as claimed in claim 1 further comprising:
   generating the predefined frequency; and
   updating the start window traffic speed and the end window traffic speed based on a respective instance of the predefined frequency.

6. The system as claimed in claim 1 wherein the control unit is for checking the start window traffic speed and the end window traffic speed within a time frame.

7. A method of operation of a navigation system comprising:
   selecting a road segment by portioning a road network including multiple road segments;
   generating a start window having a start window range at the road segment;
   generating an end window having an end window range, with a control unit executing a software, at the road segment wherein the start window and the end window are independent from one another within the road segment;
   scaling the start window range for changing a distance to monitor a vehicle within the start window to stop tracking the vehicle by the control unit including a controller interface to receive and transmit, with an external source, information representing a traffic speed of the vehicle within the start window;
   scaling the end window range for changing the distance to monitor the vehicle within the end window to stop tracking the vehicle by the control unit including the controller interface to receive and transmit with an external source, information representing the traffic speed of the vehicle within the end window;
   adjusting a predefined time period in real time for changing a duration of time to change a sample size of data to be gathered;
   calculating a start window traffic speed within the start window range based on the predefined time period;
   calculating an end window traffic speed within the end window range based on the predefined time period wherein the predefined time period for calculating the end window traffic speed different from the predefined time period for calculating the start window traffic speed;
   updating the start window traffic speed at a predefined frequency different from the predefined frequency for updating the end window traffic speed wherein the predefined frequency representing how many number of times the start window traffic speed or the end window traffic speed is updated within the predefined time period, wherein the predefined frequency is dynamically updated based on a time of day;
   estimating a traffic flow of the road segment based on a discrepancy between the start window traffic speed and the end window traffic speed; and
   transmitting the traffic flow for displaying on a device by a further control unit operating a user interface.

8. The method as claimed in claim 7 wherein:
   selecting the road segment includes selecting the road segment having an intersection and the intersection having a traffic controller; and further comprising:
disregarding the start window traffic speed, the end window traffic speed, or a combination thereof when the traffic controller stops the traffic flow through the intersection.

9. The method as claimed in claim 7 further comprising:
generating a predefined time period; and
wherein:
calculating the start window traffic speed includes averaging the start window traffic speed within the predefined time period; and
calculating the end window traffic speed includes averaging the end window traffic speed within the predefined time period.

10. The method as claimed in claim 7 wherein estimating the traffic flow includes checking the start window traffic speed and the end window traffic speed within a time frame.

11. The method as claimed in claim 7 wherein generating the start window and the end window includes generating the start window and the end window, the road segment not having both the start window and the end window.

12. A navigation system comprising:
a control unit including a processor executing a software for:
selecting a road segment by portioning a road network including multiple road segments;
generating a start window including a start window range at the road segment;
generating an end window including an end window range at the road segment wherein the start window and the end window are independent from one another within the road segment,
scaling the start window range for changing a distance to monitor a vehicle within the start window by the control unit including a controller interface to receive and transmit, with an external source, information representing a traffic speed of the vehicle within the start window;
scaling the end window range for changing the distance to monitor the vehicle within the end window by the control unit including the controller interface to receive and transmit with an external source, information representing the traffic speed of the vehicle within the end window;
adjusting a predefined time period in real time for changing a duration of time to change a sample size of data to be gathered,
calculating a start window traffic speed based on the predefined time period for traveling within the start window range of the start window,
calculating an end window traffic speed based on the predefined time period for traveling within the end window range of the end window wherein the predefined time period for calculating the end window traffic speed different from the predefined time period for calculating the start window traffic speed,
updating the start window traffic speed at a predefined frequency different from the predefined frequency for updating the end window traffic speed wherein the predefined frequency representing how many number of times the start window traffic speed or the end window traffic speed is updated within the predefined time period, wherein the predefined frequency is dynamically updated based on a time of day,
estimating a traffic flow of the road segment based on a discrepancy between the start window traffic speed and the end window traffic speed, and
a communication unit including a microelectronic, coupled to the control unit, for transmitting the traffic flow for displaying on a device by a further control unit operating a user interface.

13. The system as claimed in claim 12 wherein the control unit is for scaling the start window, the end window, or a combination thereof for selecting the location of the start window, the end window, or a combination thereof along the road segment.

14. The system as claimed in claim 12 wherein the control unit is for generating the start window having the start window range, and includes a start window generator module is for scaling the start window range.

15. The system as claimed in claim 12 wherein the control unit is for generating the end window having the end window range; and includes an end window generator module is for scaling the end window range.

16. The system as claimed in claim 12 wherein the control unit is for:
generating the predefined frequency; and
updating the start window traffic speed and the end window traffic speed based on a respective instance of the predefined frequency.

17. The system as claimed in claim 12 wherein the control unit is for:
generating the start window having the start window range and the end window having the end window range for the road segment,
scaling the start window range,
scaling the end window range,
calculating the start window traffic speed within the start window range, and
calculating the end window traffic speed within the end window range.

18. The system as claimed in claim 17 wherein the control unit is for:
selecting the road segment having an intersection and the intersection having a traffic controller; and
disregarding the start window traffic speed, or a combination thereof when the traffic controller stops the traffic flow through the intersection.

19. The system as claimed in claim 17 wherein the control unit is for:
generating a predefined time period;
averaging the start window traffic speed within the predefined time period; and
averaging the end window traffic speed within the predefined time period.

20. The system as claimed in claim 17 wherein the control unit is for generating the start window and the end window, the road segment not having both the start window and the end window.

* * * * *